United States Patent
Hidaka et al.

(10) Patent No.: US 9,451,676 B2
(45) Date of Patent: Sep. 20, 2016

(54) LIGHTING CONTROL DEVICE AND LIGHTING SYSTEM

(71) Applicant: Panasonic Intellectual Property Management Co., Ltd., Osaka (JP)

(72) Inventors: Yuto Hidaka, Osaka (JP); Shinji Matsuda, Saitama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 32 days.

(21) Appl. No.: 14/442,902

(22) PCT Filed: Nov. 6, 2013

(86) PCT No.: PCT/JP2013/006532
§ 371 (c)(1),
(2) Date: May 14, 2015

(87) PCT Pub. No.: WO2014/076907
PCT Pub. Date: May 22, 2014

(65) Prior Publication Data
US 2015/0305119 A1    Oct. 22, 2015

(30) Foreign Application Priority Data
Nov. 16, 2012    (JP) ................. 2012-252563

(51) Int. Cl.
H05B 37/02    (2006.01)

(52) U.S. Cl.
CPC ...... *H05B 37/0218* (2013.01); *H05B 37/0227* (2013.01); *H05B 37/0272* (2013.01); *Y02B 20/40* (2013.01); *Y02B 20/44* (2013.01); *Y02B 20/46* (2013.01)

(58) Field of Classification Search
CPC .................................................. H05B 37/02
USPC ................... 315/291, 307, 209 R, 246, 312
See application file for complete search history.

(56) References Cited

U.S. PATENT DOCUMENTS

| | | | | |
|---|---|---|---|---|
| 4,551,654 A | * | 11/1985 | Barnum ............. | H05B 37/0227 318/159 |
| 2002/0047646 A1 | * | 4/2002 | Lys ..................... | H05B 33/0857 315/312 |

(Continued)

FOREIGN PATENT DOCUMENTS

| | | |
|---|---|---|
| JP | 2009-283183 A | 12/2009 |
| JP | 2011-081982 A | 4/2011 |

(Continued)

OTHER PUBLICATIONS

International Search Report issued in PCT/JP2013/006532, dated Jan. 28, 2014, with English translation.

*Primary Examiner* — Minh D A
(74) *Attorney, Agent, or Firm* — McDermott Will & Emery LLP

(57) ABSTRACT

A detector detects first information which represents sensing presence or absence of a person in an illuminated space and represents a position of the person in the illuminated space when sensing the presence, and second information representing brightness of the illuminated space. When external light enters the illuminated space, a controller receives both detected results of first information and second information and controls lighting fixtures in a lump so that the second information becomes a prescribed target value when the presence is sensed. When no external light enters the illuminated space, the controller receives a detected result of the first information and individually controls respective lighting fixtures in accordance with the first information regardless of the second information.

8 Claims, 5 Drawing Sheets

(56) References Cited

U.S. PATENT DOCUMENTS

| | | | |
|---|---|---|---|
| 2008/0265799 A1* | 10/2008 | Sibert | H05B 37/0245 315/292 |
| 2011/0186714 A1* | 8/2011 | Hung | G01J 1/44 250/214 AL |
| 2012/0206050 A1* | 8/2012 | Spero | B60Q 1/04 315/152 |
| 2012/0235579 A1* | 9/2012 | Chemel | F21S 2/005 315/152 |

FOREIGN PATENT DOCUMENTS

| JP | 2011-113767 A | 6/2011 |
|---|---|---|
| JP | 2011-249130 A | 12/2011 |

* cited by examiner

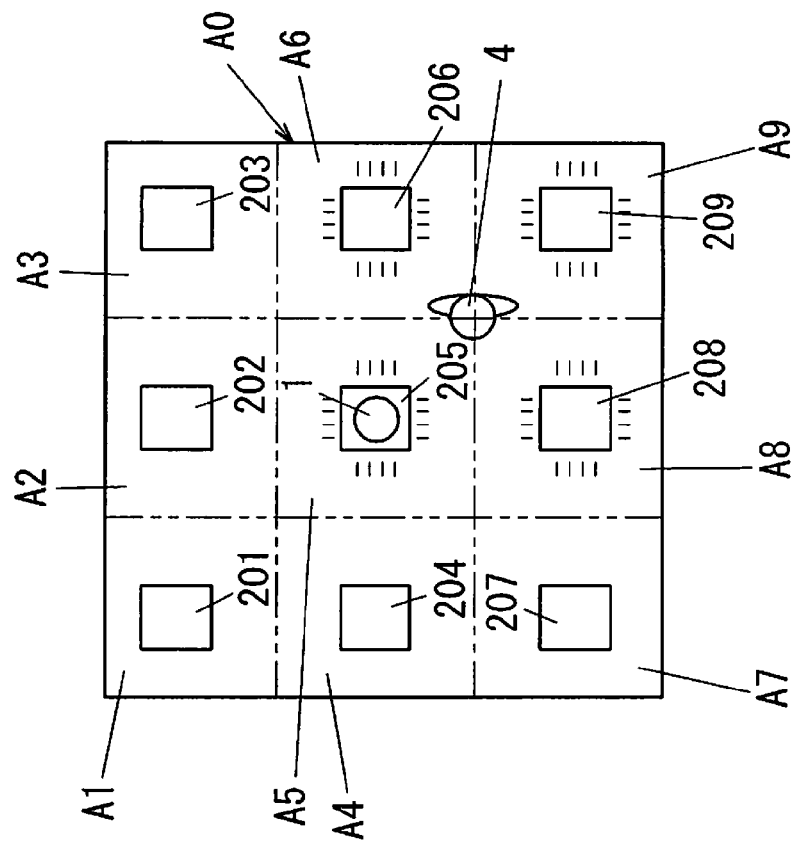
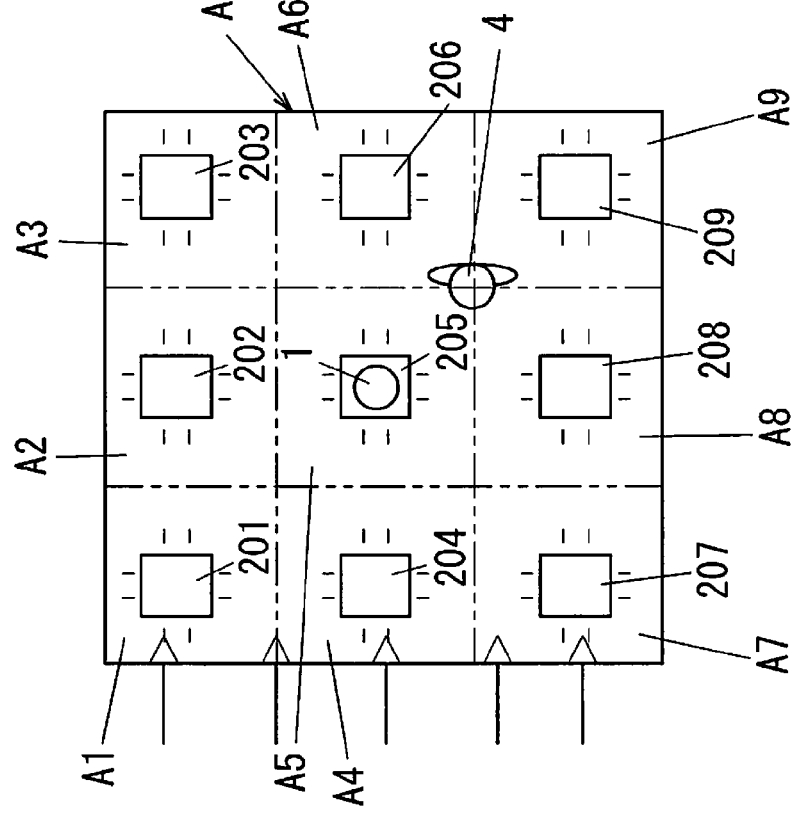

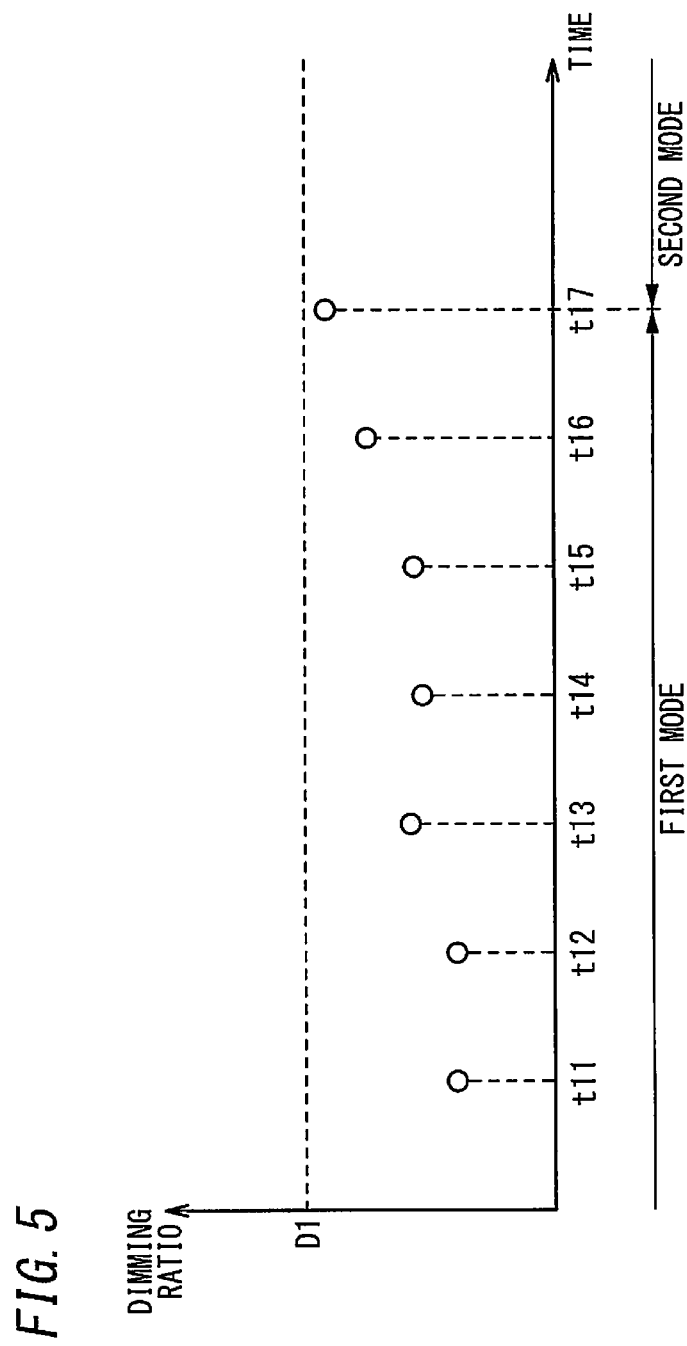

US 9,451,676 B2

LIGHTING CONTROL DEVICE AND LIGHTING SYSTEM

RELATED APPLICATIONS

This application is the U.S. National Phase under 35 U.S.C. §371 of International Application No. PCT/JP2013/006532, filed on Nov. 6, 2013, which in turn claims the benefit of Japanese Application No. 2012-252563, filed on Nov. 16, 2012, the disclosures of which Applications are incorporated by reference herein.

TECHNICAL FIELD

The invention relates generally to lighting control devices and lighting systems and, more particularly, to a lighting control device configured to control lighting fixtures for giving respective light to an illuminated space, and a lighting system with the same.

BACKGROUND ART

A technology for sensing presence or absence of a person in an illuminated space (a region of a captured image) based on an image sensor with a solid-state image sensing device such as a CCD (Charge Coupled Device) or a CMOS (Complementary Metal Oxide Semiconductor) has been known so far. There is proposed a lighting system that applies such a technology to lighting control and is configured to turn on a lighting fixture (a lighting load) when it is judged that a person is present in an illuminated space, based on a captured image by an image sensor. Such a lighting (control) system is described in JP Pub. No. 2011-113767 (hereinafter referred to as "Document 1").

A lighting control device used for the lighting system described in Document 1 has a function for alternately switching between a first mode for sensing presence or absence of a person in an illuminated space based on the image sensor and a second mode for detecting brightness of the illuminated space based on the image sensor. The lighting control device is configured to control a lighting fixture so that in the first mode, a lighting state of the lighting fixture is changed if the presence of the person in the illuminated space is sensed from a captured image, and so that in the second mode, an average value of brightness values of the captured image is included in a target range.

When detecting the brightness, the lighting control device also uses, for calculation of the average value of brightness values, only brightness values in a pixel range(s) of the captured image, which does not include an image of the person. The lighting control device can accordingly calculate the average value of brightness values except for the pixel range(s) of which brightness values have large changes, and enhance precision of brightness control.

The lighting control device described in Document 1 is to perform control such that the average value of brightness values of the captured image corresponding to brightness of the illuminated space approaches a target value regardless of whether or not external light enters the illuminated space. Accordingly, when the control object of the lighting control device is lighting fixtures, it is necessary to light lighting fixtures in not only an area in which a person is present, but also an area in which no person is present, in order to make the brightness of the illuminated space approach the target value in a state of no external light entering the illuminated space. As a result, energy-saving effect by introduction of the lighting system may be reduced.

SUMMARY OF INVENTION

The present invention has been achieved in view of the above circumstances, and an object thereof is to provide a lighting control device capable of providing high energy-saving effect in a case where a control object thereof is lighting fixtures, and a lighting system with the same.

A lighting control device of the present invention is a lighting control device configured to control each of lighting fixtures for giving respective light to an illuminated space, and includes an acquisition unit, a detector, a controller, a judgment unit and a switch. The acquisition unit is configured to acquire, from an image sensor for capturing an image of the illuminated space, the captured image. The detector is configured to detect first information which represents sensing presence or absence of a person in the illuminated space and represents a position of the person in the illuminated space when sensing the presence, and second information representing brightness of the illuminated space. The controller is configured to control each of the lighting fixtures. The judgment unit is configured to judge whether or not external light enters the illuminated space. The external light is light except for respective light from the lighting fixtures. The switch is configured to switch an operation mode of the controller so that it becomes a first mode when it is judged by the judgment unit that the external light enters, and so that it becomes a second mode when it is judged that no external light enters. The controller is configured: in the first mode, to receive both detected results of the first information and the second information from the detector and to control the lighting fixtures in a lump so that the second information becomes a prescribed target value when the person is present in the illuminated space; and in the second mode, to receive a detected result of the first information from the detector and to individually control respective lighting fixtures in accordance with the first information regardless of the second information when the person is present in the illuminated space.

In the lighting control device, it is desirable that the controller be configured, in the second mode, to light part of the lighting fixtures and to turn off remaining part thereof in accordance with the first information when the person is present in the illuminated space, and that the part of the lighting fixtures give light around the person.

In the lighting control device, it is desirable that the controller be configured, in the second mode, to light all of the lighting fixtures at a reference dimming ratio when no person is present in the illuminated space, and that the reference dimming ratio be a value that is set so that minimum quantity of light that is necessary to detect the first information from the captured image is secured in the illuminated space.

In the lighting control device, it is desirable that the controller be configured, when the person is present in the illuminated space in the first mode, to increase dimming ratios of the lighting fixtures if the second information is below the target value and to decrease the dimming ratios of the lighting fixtures if the second information is above the target value.

In the lighting control device, it is desirable that the target value have a prescribed range, and that the controller be configured, when the person is present in the illuminated space in the first mode, to control the lighting fixtures so that the second information is included in the range of the target value.

In the lighting control device, it is desirable that the controller be configured, in the first mode, to turn off the lighting fixtures in a lump when no person is present in the illuminated space.

In the lighting control device, it is desirable that the image sensor comprise an amplifier configured to amplify an output, and an AGC circuit configured to automatically adjust an amplification factor of the amplifier, and that the judgment unit be configured to judge whether or not the external light enters based on the amplification factor automatically adjusted by the AGC circuit.

A lighting system of the present invention includes the abovementioned lighting control device and the abovementioned lighting fixtures.

BRIEF DESCRIPTION OF DRAWINGS

FIG. 3A is a view illustrating an operating state of the lighting system in the embodiment when external light enters, and FIG. 3B is a view illustrating an operating state of the lighting system in the embodiment when no external light enters;

FIG. 5 is a view illustrating an operation of the lighting system in the embodiment.

DESCRIPTION OF EMBODIMENTS

Figure 1:
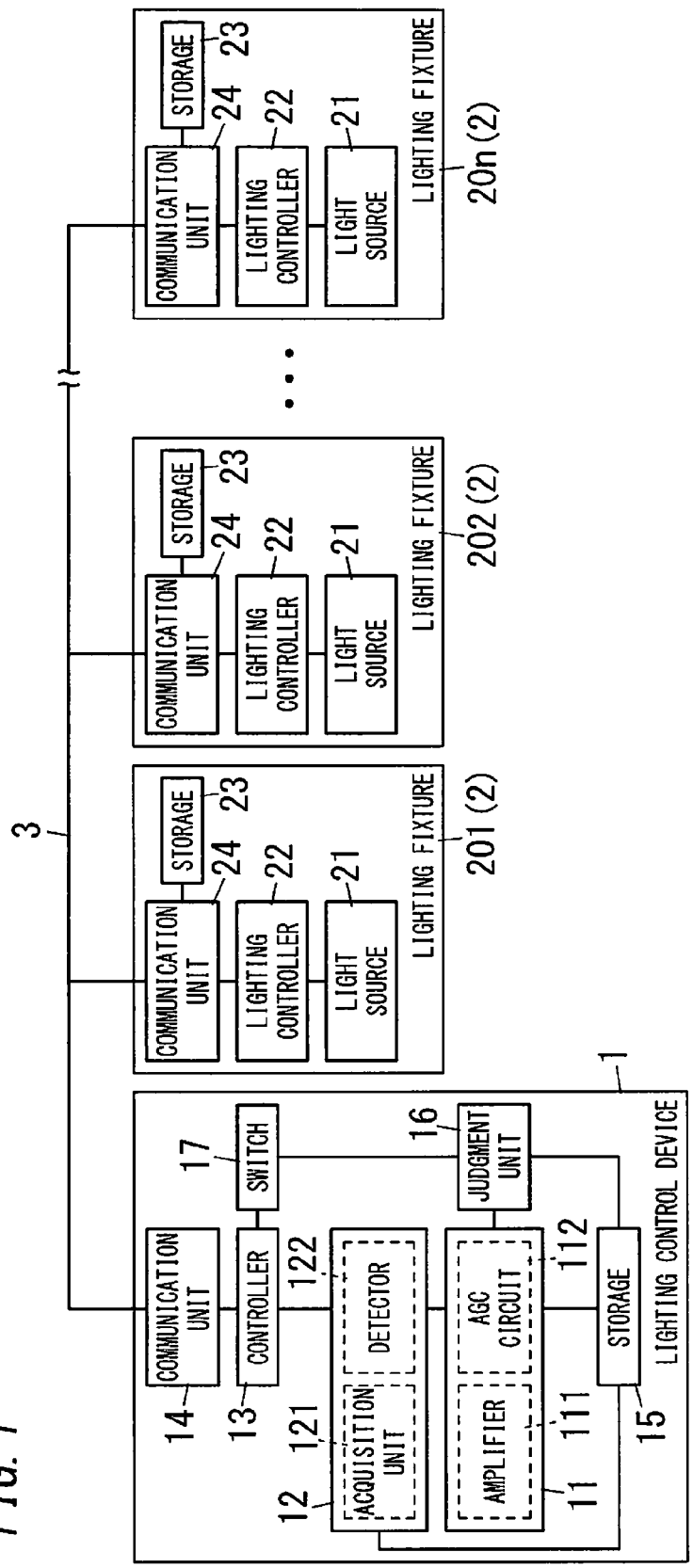
FIG. 1 is a block diagram of a lighting system in an embodiment.
Figure 2:
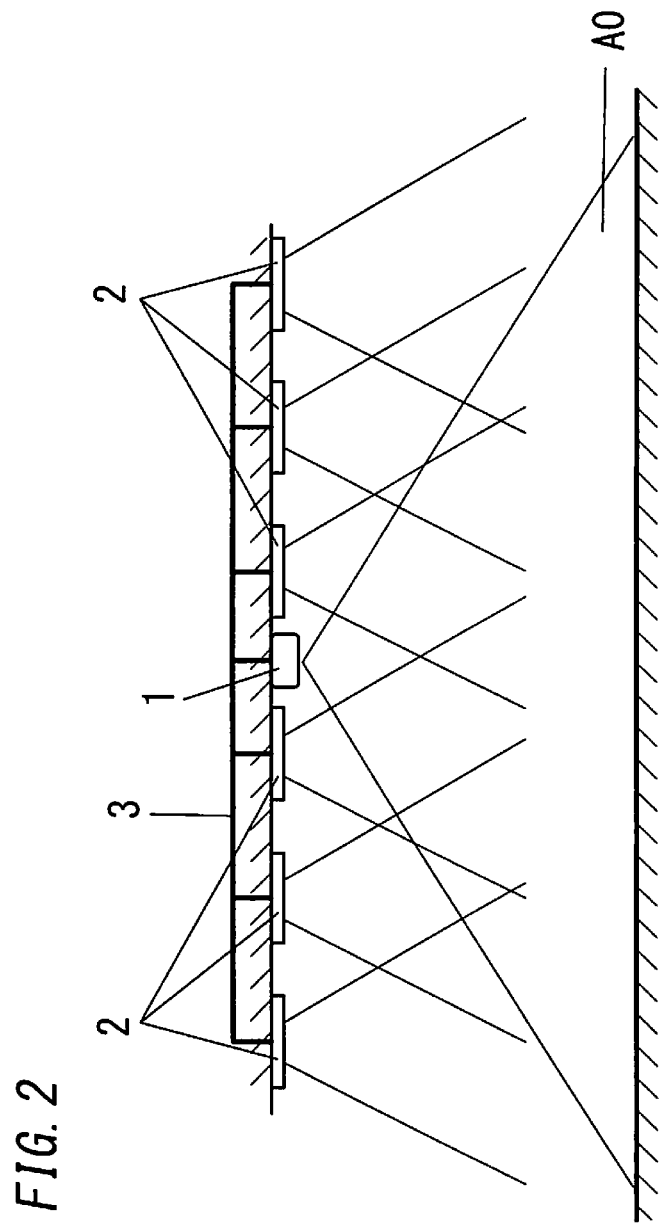
FIG. 2 is a view illustrating an introduction example of the lighting system in the embodiment.

As shown in FIG. 1, a lighting control device in accordance with the present embodiment is a lighting control device 1 configured to control each of lighting fixtures 201, 202, . . . , 20n for giving respective light to an illuminated space A0 (see FIG. 2).

The lighting control device 1 includes an acquisition unit 121, a detector 122, a controller 13, a judgment unit 16 and a switch 17.

The acquisition unit 121 is configured to acquire, from an image sensor 11 for capturing an image of the illuminated space A0, the captured image.

The detector 122 is configured to detect first information which represents sensing presence or absence of a person in the illuminated space A0 and represents a position(s) of the person(s) in the illuminated space A0 when sensing the presence and second information representing brightness of the illuminated space A0.

The controller 13 is configured to control each of the lighting fixtures 201, 202, . . . , 20n.

The judgment unit 16 is configured to judge whether or not external light enters the illuminated space A0, where the external light is light except for respective light from the lighting fixtures 201, 202, . . . , 20n.

The switch 17 is configured to switch an operation mode of the controller 13 so that it becomes a first mode when it is judged by the judgment unit 16 that the external light enters and so that it becomes a second mode when it is judged that no external light enters.

The controller 13 is configured, in the first mode, to receive both detected results of the first information and the second information from the detector 122 and to control the lighting fixtures 201, 202, . . . , 20n in a lump so that the second information becomes a prescribed target value when the person(s) is(are) present in the illuminated space A0.

The controller 13 is also configured, in the second mode, to receive a detected result of the first information from the detector 122 and to individually control respective lighting fixtures 201, 202, . . . , 20n in accordance with the first information regardless of the second information when the person(s) is(are) present in the illuminated space A0.

In the embodiment, the controller 13 may be configured, in the second mode, to light part of the lighting fixtures 201, 202, . . . , 20n and to turn off remaining part thereof in accordance with the first information when the person(s) is(are) present in the illuminated space A0. The part of the lighting fixtures gives light around the person(s).

The controller 13 may be also configured, in the second mode, to light all of the lighting fixtures 201, 202, . . . , 20n at a reference dimming ratio when no person is present in the illuminated space A0. The reference dimming ratio is a value that is set so that minimum quantity of light that is necessary to detect the first information from the captured image is secured in the illuminated space A0.

The controller 13 may be configured, when the person(s) is(are) present in the illuminated space A0 in the first mode, to increase dimming ratios of the lighting fixtures 201, 202, . . . , 20n if the second information is below the target value. In this case, the controller 13 is configured to decrease the dimming ratios of the lighting fixtures 201, 202, . . . , 20n if the second information is above the target value.

In the lighting control device 1, the target value may have a prescribed range. In this case, the controller 13 is configured, when the person(s) is(are) present in the illuminated space A0 in the first mode, to control the lighting fixtures 201, 202, . . . , 20n so that the second information is included in the range of the target value.

The controller 13 may be configured, in the first mode, to turn off the lighting fixtures 201, 202, . . . , 20n in a lump when no person is present in the illuminated space A0.

The image sensor 11 includes an amplifier 111 configured to amplify an output, and an AGC circuit 112 configured to automatically adjust an amplification factor of the amplifier 111. The judgment unit 16 may be configured to judge whether or not the external light enters based on the amplification factor automatically adjusted by the AGC circuit 112.

A lighting system in accordance with the embodiment includes the abovementioned lighting control device 1 and the lighting fixtures 201, 202, . . . , 20n.

Hereinafter, the lighting control device 1 in accordance with the embodiment and the lighting system with the same will be explained in detail.

As shown in FIG. 1, the lighting system in the embodiment includes a lighting control device (a controller) 1 and lighting fixtures 201, 202, . . . , 20n. Hereinafter, each of the lighting fixtures 201, 202, . . . , 20n is simply referred to as a "lighting fixture 2" when they are not individually distinguished in particular. The lighting fixtures 201, 202, . . . , 20n give light to the illuminated space A0 (see FIG. 2). In short, the lighting fixtures 201, 202, . . . , 20n are configured to give respective light to the illuminated space A0. The lighting control device 1 controls each of the lighting fixtures 201, 202, . . . , 20n. In an example explained below, the lighting system is used for an office and each lighting fixture 2 is a ceiling lighting fixture mounted on a ceiling, but the use of the lighting system is not limited thereto.

As shown in FIG. 1, each lighting fixture 2 includes a lighting controller 22 configured to control a lighting state of a light source 21, a (fixture-side) storage 23 configured to store a unique address, and a (fixture-side) communication unit 24 configured to communicate with the lighting control device 1. For example, the light source 21 may be an LED(s) (a Light Emitting Diode(s)) or a fluorescent lamp(s), and may be integrally provided for the lighting fixture 2 or provided separately from the lighting fixture 2. Each lighting fixture 2 may be formed of lighting units (not shown) of each of which has a housing which a light source 21 is in.

The lighting fixtures 201, 202, ..., 20n are respectively provided in areas A1, A2, ..., An into which the illuminated space A0 is divided (see FIG. 3). All of them are lit, thereby illuminating a whole of the illuminated space A0. That is, a lighting fixture 20n is attached to a ceiling in an area An (n=1, 2, 3, ...), such as a lighting fixture 201 attached to a ceiling in an area A1 and a lighting fixture 202 attached to a ceiling in an area A2. The details will be mentioned later, but the illuminated space A0 illuminated by the lighting fixtures 201, 202, ..., 20n is a space of at least part of the office, covered by a visual field of the image sensor 11.

The lighting controller 22 is configured, in accordance with a control signal received through the communication unit 24 from the lighting control device 1, to perform switch control for turning on or off the light source 21, dimming control for lighting the light source 21 at an instructed dimming ratio, and the like. That is, the lighting controller 22 is to light the light source 21 at a dimming ratio contained in the control signal from the lighting control device 1. The dimming ratio in this example is a value representing a ratio of brightness to full lighting where full lighting is 100%, and can be adjusted in a range of 5 to 100%.

The communication unit 24 is to be connected to the lighting control device 1 through a communication line 3, and communicate with the lighting control device 1 by a signal transmitted over the communication line 3. A communication method between the lighting control device 1 and each lighting fixture 2 is appropriately set, and is not limited to wire communication but may be wireless communication.

As shown in FIG. 1, the lighting control device 1 includes an image sensor 11, an image processor 12 configured to perform image processing of a captured image by the image sensor 11, a controller 13 configured to control each lighting fixture 2, a (device-side) communication unit 14 configured to communicate with each lighting fixture 2, and a (device-side) storage 15. As shown in FIG. 2, the lighting control device 1 is disposed on a center part of a ceiling in the illuminated space A0, and thereby the image sensor 11 can capture an image of the illuminated space A0 seen from the ceiling.

The image sensor 11 is, e.g., a two-dimensional image sensor with a solid-state image sensing device in which photo detectors (not shown) are arranged two-dimensionally, such as a CCD (Charge Coupled Device) or a CMOS (Complementary Metal Oxide Semiconductor). The image sensor 11 is disposed so that the illuminated space A0 is covered by the visual field thereof. The image sensor 11 is not limited to a configuration in which it is integrally provided for the lighting control device 1, but may be a configuration in which it is provided separately from the lighting control device 1 and the captured image is transmitted to the lighting control device 1.

The captured image of the illuminated space A0 by the image sensor 11 is given to the image processor 12. In the embodiment, the photo detectors correspond to respective pixels of the captured image, and output values of the photo detectors (electrical charges) corresponds to respective pixel values of the captured image. As quantity of light received by each photo detector becomes larger, a corresponding pixel value becomes larger.

Besides the solid-state image sensing device, the image sensor 11 includes a converter (not shown) configured to convert an output value of each photo detector as analog data into digital data, and an amplifier 111 configured to amplify the converted output value (digital data). That is, the image sensor 11 generates the captured image of the illuminated space A0 through the solid-state image sensing device, converts the captured image through the converter, amplifies it through the amplifier 111, and then supplies image data of the captured image to the image processor 12.

The image sensor 11 includes an AGC (Automatic Gain Control) circuit 112. The image sensor 11 can automatically adjust an amplification factor (gain) of the amplifier 111 through the AGC circuit 112 so as to obtain a constant output signal from the amplifier 111 even when an input signal of the amplifier 111 fluctuates. In the embodiment, the amplification factor is a ratio of an average value of all output values of the amplifier 111 to an average value of all output values of the photo detectors. The image sensor 11 can secure proper brightness of the captured image by increasing the amplification factor of the amplifier 111 through the AGC circuit 112 even when the illuminated space A0 is comparatively dark, for example.

The image processor 12 includes a function as an acquisition unit 121 configured to acquire the captured image from the image sensor 11. The image processor 12 includes a function as a detector 122 configured to detect (find) first information and second information from the captured image. The first information is information representing presence or absence of a person(s) in the illuminated space A0 and a position(s) of the person(s) in the illuminated space A0 when the person(s) is(are) present therein. The second information is information quantitatively representing brightness of the illuminated space A0. In the embodiment, the image processor 12 is formed of a DSP (Digital Signal Processor), and configured to acquire the captured image from the image sensor 11 to perform image processing of the captured image.

Specifically, the storage 15 previously stores, as a background image, an image of the illuminated space A0 captured in the absence of any person in the illuminated space A0. The image processor 12 acquires a current captured image through the acquisition unit 121 and generates a difference image by calculating a difference between pixel values per pixel between the captured image and the background image. When the captured image includes a person(s), pixel values in a range(s) of the captured image corresponding to the person(s) do not agree with those in a corresponding range(s) of the background image. Therefore, when a person(s) is(are) present in the illuminated space A0, pixel values of the difference image corresponding to the person(s) do not become "0".

The image processor 12 therefore calculates a value such as a total number of pixels in the difference image, each of which value is not "0", or a size of an aggregation of adjoining pixels therein, and judges that a person(s) is(are) present in the illuminated space A0 if such a value exceeds a prescribed threshold. When the person(s) is(are) present in the illuminated space A0, the image processor 12 judges that the person(s) is(are) present in a position(s) in the illuminated space A0, corresponding to pixels of the difference image, of each of which value is not "0". Thus, the image processor 12 is configured to detect (calculate) the first information which represents sensing presence or absence of a person(s) through the detector 122 and represents the position(s) of the person(s) when sensing the presence.

The image processor 12 further detects (measures), as the second information, the brightness of the illuminated space A0 from the captured image through the detector 122. In the embodiment, the brightness of the illuminated space A0 cannot be detected from the captured image itself because the image sensor 11 has the AGC circuit 112 and adjusts the brightness of the captured image, as described above. When detecting the brightness of the illuminated space A0, the image processor 12 therefore fixes the amplification factor of the amplifier 111 of the image sensor 11 to a predetermined reference value and calculates an average value of pixel values in the captured image to detect average brightness (illuminance) of the illuminated space A0. In this case, only pixel values in a pixel range(s), including no person, of the captured image may be used for calculation of the average by the image processor 12. As a result, the image processor 12 can calculate an average value of pixel values except for a range(s) including pixels of each of which value largely fluctuates, and detect the brightness more accurately. By processing during which the abovementioned first information is detected, the image processor 12 distinguishes between a pixel range including a person(s) and a pixel range including no person in the captured image.

Thus, the image processor 12 has a function as the detector 122 configured to detect the first information and the second information from the captured image. Alternatively, the image processor 12 may be configured to replace the background image in the storage 15 with a newest captured image in proper order.

The controller 13 transmits a control signal to each lighting fixture 2 through the communication unit 14, thereby controlling each of the lighting fixtures 201, 202, . . . , 20n. That is, the controller 13 controls the lighting fixtures 2 so that in accordance with the control signal each lighting controller 22 of the lighting fixtures 2 performs switch control for turning on or off a corresponding lighting fixture 2, dimming control at an instructed dimming ratio, and the like. In the embodiment, the controller 13 controls the lighting fixtures 2 in accordance with a detected result(s) by the detector 122 of the image processor 12 (at least one of the first information and the second information). An output signal of the image processor 12 is therefore input to the controller 13.

The communication unit 14 is to be connected to the communication units 24 of the lighting fixtures 2 through the communication line 3, and communicate with the lighting fixtures 2 by a signal transmitted over the communication line 3. In the embodiment, the communication unit 14 designates a lighting fixture 2 as a transmission destination by an address stored in the storage 23.

The lighting control device 1 in the embodiment is configured to not always operate in accordance with the same control algorithm but operate in accordance with any one of different algorithms, which is applied in response to whether or not external light enters the illuminated space A0. In the embodiment, the external light is light except for respective light from the lighting fixtures 201, 202, . . . , 20n constituting the lighting system, such as sunlight entering the illuminated space A0 through a window(s) facing the illuminated space A0 or illumination light from a space adjoining the illuminated space A0.

That is, when the external light enters the illuminated space A0, the lighting control device 1 receives both detected results of the first information and the second information and controls the lighting fixtures 201, 202, . . . , 20n in a lump so that the brightness of the illuminated space A0 becomes a prescribed target value when a person(s) is(are) present therein. On the other hand, when no external light enters the illuminated space A0, the lighting control device 1 receives a detected result of the first information and individually controls respective lighting fixtures 201, 202, . . . , 20n in accordance with the first information regardless of the brightness of the illuminated space A0 when a person(s) is(are) present therein.

A configuration of the lighting control device 1 for realizing such an operation is explained hereinafter.

As shown in FIG. 1, the lighting control device 1 further includes a judgment unit 16 and a switch 17. The lighting control device 1 may be formed of a computer. In this case, the computer executes a program stored in the storage 15, thereby functioning as the image processor 12 (the acquisition unit 121 and the detector 122), the controller 13, the communication unit 14, the judgment unit 16 and the switch 17. The program may be provided through a telecommunication line or a storage medium in which it is stored.

The judgment unit 16 judges whether or not the external light enters the illuminated space A0. In an example of the embodiment, the judgment unit 16 uses the amplification factor of the amplifier 111 in the image sensor 11 for judging whether or not the external light enters the illuminated space A0. That is, since the amplification factor of the amplifier 111 is automatically adjusted through the AGC circuit 112 as stated above, the amplification factor increases if the illuminated space A0 is comparatively dark or conversely the amplification factor decreases if the illuminated space A0 is comparatively bright. Based on this, the judgment unit 16 judges whether or not the external light enters from the amplification factor of the amplifier 111 automatically adjusted through the automatic gain control (AGC). In short, the judgment unit 16 judges that no external light enters if the amplification factor of the amplifier 111 is a specified value or more and that the external light enters if the amplification factor of the amplifier 111 is below the specified value.

The switch 17 switches an operation mode of the controller 13 in accordance with a judged result by the judgment unit 16 so that it becomes a first mode when it is judged by the judgment unit 16 that the external light enters and so that it becomes a second mode when it is judged that no external light enters.

In the first mode, the controller 13 receives both detected results of the first information and the second information from the image processor 12 (the detector 122), and controls the lighting fixtures 201, 202, . . . , 20n in a lump so that the second information (the brightness) becomes the prescribed target value when a person(s) is(are) present in the illuminated space. That is, in the first mode, the controller 13 receives a detected result of the brightness of the illuminated space A0 if a person(s) is(are) present in the illuminated space A0, and controls the dimming ratios of the lighting fixtures 201, 202, . . . , 20n in a lump regardless of a position(s) of the person(s) so that the brightness approaches the target value. Specifically, the controller 13 increases the dimming ratios if the detected result of the second information (the brightness) is below the target value (dark) and decreases the dimming ratios if the detected result of the second information (the brightness) is above the target value (bright). The target value may have a certain range (a prescribed range). In this case, the controller 13 controls the lighting fixtures 201, 202, . . . , 20n in a lump so that the detected result of the brightness is in the range of the target value, i.e., between an upper limit and a lower limit of the target value.

In the first mode, if no person is present in the illuminated space A0, the controller 13 turns off the lighting fixtures 201, 202, . . . , 20n in a lump. However, even in this state, the external light enters the illuminated space A0 and it is accordingly possible to secure the brightness of the illuminated space A0 that is necessary to sense presence of a person(s) from the captured image from the image sensor 11. The controller 13 may be configured to, when no person is present in the illuminated space A0 in the first mode, not turn off the lighting fixtures 201, 202, . . . , 20n but light them in a lump at a dimming ratio that is previously set to be comparatively low.

On the other hand, in the second mode, the controller 13 receives only the detected result of the first information from the image processor 12 (the detector 122), and individually controls respective lighting fixtures 201, 202, . . . , 20n in accordance with the first information regardless of the second information. That is, the controller 13 receives only the first information of two pieces information of the first information and the second information from the detector 122. In this case, if no person is present in the illuminated space A0, the controller 13 lights all of the lighting fixtures 201, 202, . . . , 20n at a reference dimming ratio. If a person(s) is(are) present in the illuminated space A0, the controller 13 lights only part (2) of the lighting fixtures 201, 202, . . . , 20n giving light around the person(s) and turns off remaining part thereof. The controller 13 may light the part of the lighting fixtures 2 giving light around the person(s) at full lighting (a dimming ratio of 100%) or at a dimming ratio below 100%.

In the embodiment, the aforementioned reference dimming ratio is a value that is previously set so that the brightness of the illuminated space A0 becomes minimum brightness that is necessary to sense presence of a person(s) from the captured image acquired through the image sensor 11. That is, the reference dimming ratio is a value that is set so that minimum quantity of light that is necessary to detect the first information from the captured image is secured in the illuminated space. In a case where no external light enters the illuminated space A0, quantity of light, which is necessary to sense reflected light from a person(s) through the image sensor 11 if the lighting fixtures 2 are totally turned off, cannot be secured. Accordingly, the image processor 12 cannot sense presence of a person(s) from the captured image because the person(s) cannot be reflected in the captured image. The controller 13 therefore lights all of the lighting fixtures 201, 202, . . . , 20n at the reference dimming ratio so that the image processor 12 can sense presence of a person(s) from the captured image, when no person is present in the illuminated space A0 in the second mode. The lighting control device 1 can accordingly secure the minimum quantity of light required for the illuminated space A0.

Thus, the lighting control device 1 is to operate in accordance with any one of different control algorithms, which is applied in response to whether or not the external light enters the illuminated space A0.

In the embodiment, the detected result representing the brightness of the illuminated space A0 (the second information) is actually reflected in control of the lighting fixtures 2 only when the controller 13 operates in the first mode and a person(s) is(are) present in the illuminated space A0. In the embodiment, the controller 13 therefore controls the image sensor 11 so as to fix the amplification factor of the amplifier 111 to the reference value if receiving, from the image processor 12 (the detector 122), a detected result representing the presence of a person(s) in the illuminated space A0 while operating in the first mode. The image processor 12 can consequently detect the brightness of the illuminated space A0 from the captured image with the amplification factor of the amplifier 111 of the image sensor 11 fixed to the reference value. Except for a case where the controller 13 receives, from the image processor 12 (the detector 122), a detected result representing presence of a person(s) in the illuminated space A0 while operating in the first mode, the controller controls the image sensor 11 so that the amplification factor of the amplifier 111 is automatically adjusted.

An operation of the controller 13 in each operation mode of the first mode and the second mode is explained with reference to FIGS. 3A and 3B. In the figures, FIG. 3A shows a state (the first mode) of the external light entering the illuminated space A0, and FIG. 3B shows a state (the second mode) of no external light entering the illuminated space.

FIGS. 3A and 3B illustrate nine lighting fixtures 201 to 209 provided to constitute the lighting system, and nine (3×3) areas A1 to A9 into which the illuminated space A0 is divided. The nine lighting fixtures 201 to 209 as the lighting fixtures 2 are disposed in the areas A1 to A9, respectively, such that the lighting fixture 201 is in the area A1, the lighting fixture 202 is in the area A2, and the like. Specifically, the lighting fixture 203 is in the area A3, the lighting fixture 204 is in the area A4, the lighting fixture 205 is in the area A5, the lighting fixture 206 is in the area A6, the lighting fixture 207 is in the area A7, the lighting fixture 208 is in the area A8, and the lighting fixture 209 is in the area A9. Each of FIGS. 3A and 3B illustrates a person 4 that is present over the areas A5, A6, A8 and A9. In the example of FIG. 3A, the external light enters from a left side of the figure, namely from a side of the areas A1, A4 and A7, and quantity of the external light becomes smaller as it more approaches a right side of the figure (a side of the areas A3, A6 and A9).

First, as shown in FIG. 3A, in a state of the external light entering the illuminated space A0, the controller 13 operates in the first mode, and receives both detected results of a position of the person (first information) and brightness (second information) in the illuminated space A0 from the image processor 12. As shown in the example of FIG. 3A, when the person 4 is present in the illuminated space A0, the controller 13 controls the lighting fixtures 201 to 209 in a lump so that the brightness of the illuminated space A0 (the second information) becomes the prescribed target value. That is, in a case where the person 4 is present in the illuminated space A0 in the first mode, the controller 13 lights all of the lighting fixtures 201 to 209 at the same dimming ratio so that the brightness of the illuminated space A0 becomes the target value regardless of the position of the person 4 in the illuminated space A0.

On the other hand, when no person 4 is present in the illuminated space A0 in the first mode, the controller 13 turns off the lighting fixtures 201 to 209 in a lump. That is, in a case where no person 4 is present therein in the first mode, the controller 13 turns off all of the lighting fixtures 201 to 209 regardless of the brightness of the illuminated space A0 (the second information).

In contrast, as shown in FIG. 3B, in a state of no external light entering the illuminated space A0 at night or the like, the controller 13 operates in the second mode, and receives only the detected result of a position of the person (the first information) in the illuminated space A0 from the image processor 12. At this time, the controller 13 individually controls the lighting fixtures 201 to 209 in accordance with the position of the person in the illuminated space A0 (the first information) regardless of the brightness of the illuminated space A0 (the second information). That is, as shown in the example of FIG. 3B, when the person 4 is present in the illuminated space A0, the controller 13 lights the lighting fixtures 205, 206, 208 and 209, giving respective light around the person 4 (the areas A5, A6, A8 and A9), of the lighting fixtures 201 to 209. The controller 13 turns off remaining lighting fixtures 201 to 204 and 207.

On the other hand, when no person 4 is present in the illuminated space A0 in the second mode, the controller 13 lights all of the lighting fixtures 201 to 209 at the reference dimming ratio. That is, in a case where no person 4 is present therein in the second mode, the controller 13 lights all of the lighting fixtures 2 at the same dimming ratio so that minimum quantity of light required for the illuminated space A0 is secured, regardless of the brightness of the illuminated space A0 (the second information).

In the embodiment, the judgment unit 16 as stated above judges whether or not the external light enters the illuminated space A0 based on the amplification factor of the amplifier 111 in the image sensor 11. Hereinafter, this point is briefly explained.

A change from the second mode to the first mode is first explained.

The lighting control device 1 lights the lighting fixtures 2 at an upper limit of the dimming ratio at night or the like when no external light enters, and the storage 15 previously stores the amplification factor (of the amplifier 111) of the image sensor 11 as a first threshold. In the embodiment, the upper limit of the dimming ratio is an upper limit in a dimming ratio range that is adjustable through the lighting control device 1, and is "100%" (full lighting), for example. While the controller 13 operates in the second mode, the lighting control device 1 periodically measures the amplification factor of the image sensor 11 to compare it with the stored first threshold.

Figure 4:
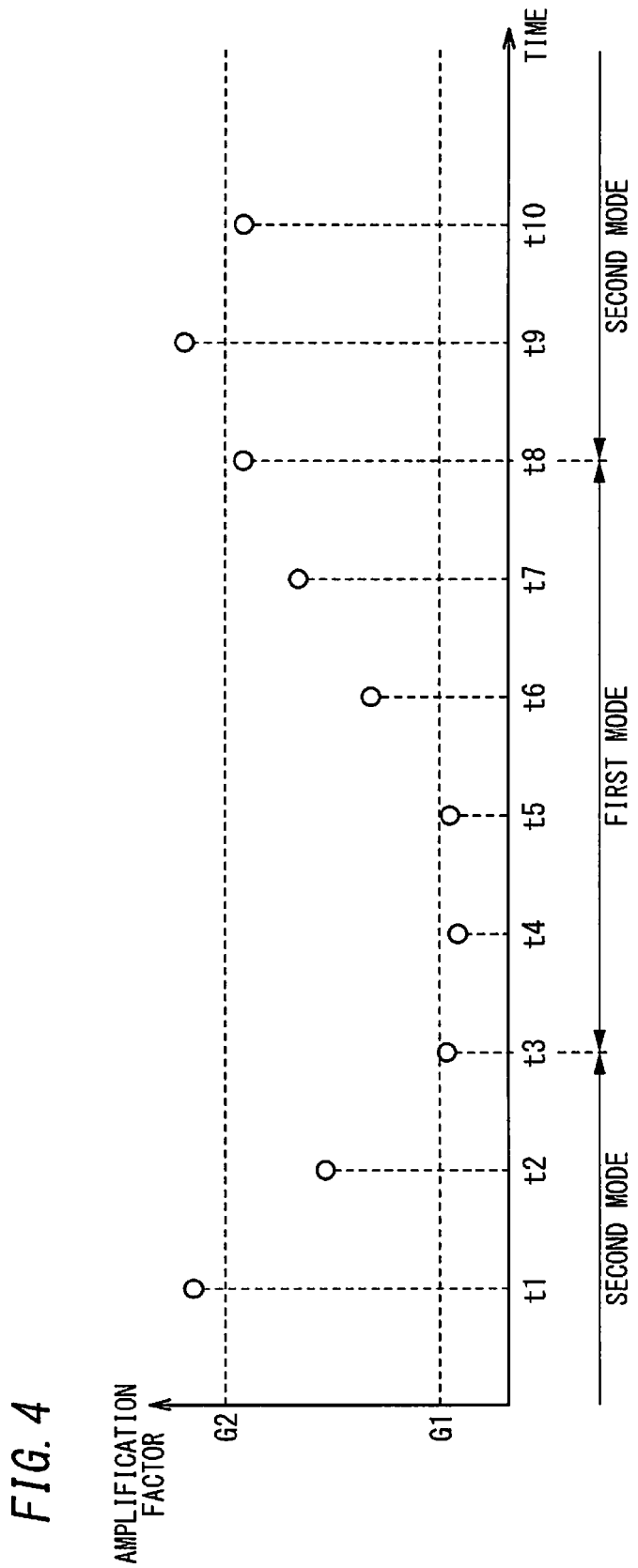
FIG. 4 is a view illustrating an operation of the lighting system in the embodiment.

FIG. 4 is a view illustrating amplification factors of the image sensor 11 measured periodically, on which white circles are plotted, where a vertical axis represents the amplification factor of the image sensor 11 and a horizontal axis represents a time axis. As shown in FIG. 4, if a current amplification factor of the image sensor 11 is the first threshold G1 or less (time t3), the judgment unit 16 judges that the external light enters the illuminated space A0, and the switch 17 changes the operation mode of the controller 13 from the second mode to the first mode.

A change from the first mode to the second mode is next explained.

The lighting control device 1 lights the lighting fixtures 2 at a lower limit of the dimming ratio at night or the like when no external light enters, and the storage 15 previously stores the amplification factor (of the amplifier 111) of the image sensor 11 as a second threshold. In the embodiment, the lower limit of the dimming ratio is a lower limit in the dimming ratio range that is adjustable through the lighting control device 1, and is "5%", for example. In the lighting control device 1, the storage 15 previously stores a value of the upper limit of the dimming ratio as well.

While the controller 13 operates in the first mode and no person is present in the illuminated space A0, the lighting control device 1 periodically measures the amplification factor of the image sensor 11 to compare it with the stored second threshold. As shown in FIG. 4, when a current amplification factor of the image sensor 11 is an approximate value to the second threshold G2 (time t8), the judgment unit 16 judges that no external light enters the illuminated space A0, and the switch 17 changes the operation mode of the controller 13 from the first mode to the second mode. In this example, in response to the amplification factor being G2−α (α is a constant) or more, the judgment unit 16 judges that no external light enters the illuminated space A0.

On the other hand, in a case where the controller 13 operates in the first mode and a person(s) is(are) present in the illuminated space A0, the amplification factor of the image sensor 11 is fixed to the reference value as stated above. The judgment unit 16 cannot accordingly judge whether or not the external light enters based on the amplification factor of the image sensor 11. In such a case, the judgment unit 16 therefore judges whether or not the external light enters based on the dimming ratios of the lighting fixtures 2. That is, the dimming ratios of the lighting fixtures 2 are automatically adjusted so that the brightness of the illuminated space A0 becomes the target value as stated above. As a result, the dimming ratio increases if the illuminated space A0 is comparatively dark. Conversely, the dimming ratio decreases if the illuminated space A0 is comparatively bright. Based on this, i.e., from the dimming ratios of the lighting fixtures 2, the judgment unit 16 can judge whether or not the external light enters the illuminated space.

Specifically, while the controller 13 operates in the first mode and a person(s) is(are) present in the illuminated space A0, the lighting control device 1 periodically compares the dimming ratio at the (current) time with the stored upper limit of the dimming ratio.

FIG. 5 is a view illustrating dimming ratios of the lighting fixtures 2 measured periodically, on which white circles are plotted, where a vertical axis represents the dimming ratio of the lighting fixtures 2 and a horizontal axis represents a time axis. As shown in FIG. 5, if a current dimming ratio of the lighting fixtures 2 is an approximate value to the upper limit of the dimming ratio D1 (time t17), the judgment unit 16 judges that no external light enters the illuminated space A0, and the switch 17 changes the operation mode of the controller 13 from the first mode to the second mode. In this example, in response to the dimming ratio being D1−β (β is a constant) or more, the judgment unit 16 judges that no external light enters the illuminated space A0.

The judgment unit 16 may be configured, when judging whether or not the external light enters based on the amplification factor or the dimming ratio as stated above, to judge whether or not the external light enters if a state of the amplification factor or the dimming ratio satisfying a prescribed condition continues for a predetermined time.

In the lighting control device 1 with the configuration explained above, the operation mode of the controller 13 is automatically changed in response to whether the external light enters the illuminated space A0. Optimum control can be therefore performed when the external light enters and when no external light enters.

That is, when the external light enters, the controller 13 operates in the first mode. The lighting control device 1 accordingly controls the lighting fixtures 201, 202, . . . , 20n in a lump so that the brightness of the illuminated space A0 becomes the prescribed target value, when a person(s) is(are) present therein regardless of the position(s) of the person(s). It is difficult to individually control the lighting fixtures 201, 202, . . . , 20n to adjust the brightness of the illuminated space A0 to the target value under an environment in which the external light enters. In contrast, the lighting control device 1 in the embodiment controls the lighting fixtures 201, 202, . . . , 20n in a lump, thereby facilitating adjusting the brightness of the illuminated space A0 to the target value.

As a result, the lighting control device 1 can secure comfort of a person(s) who is(are) present in the illuminated space A0. In a case where the external light enters the illuminated space and no person is present therein, the lighting control device 1 turns off all of the lighting fixtures 201, 202, . . . , 20n, and accordingly energy-saving effect can be expected. Therefore, in the lighting control device 1, energy-saving effect can be expected while securing the comfort when the external light enters the illuminated space A0.

When no external light enters, the controller 13 operates in the second mode. Accordingly, the lighting control device 1 individually controls respective lighting fixtures 201, 202, . . . , 20n in accordance with a position(s) of a person(s) regardless of the brightness of the illuminated space A0. This lighting control device 1 individually controls the lighting fixtures 2 in accordance with the position(s) of the person(s), thereby lighting only necessary lighting fixtures 2, though energy-saving effect decreases if some lighting fixtures 2 of which areas include no person are lit in order to make the brightness of the illuminated space A0 approach the target value under the environment in which no external light enters. In the lighting control device 1, energy-saving effect can be accordingly expected even in a case where no external light enters the illuminated space A0.

In short, when the control object is the lighting fixtures 201, 202, . . . , 20n, the lighting control device 1 in the embodiment can have high energy-saving effect regardless of whether or not the external light enters.

The controller 13 further lights all of the lighting fixtures 201, 202, . . . , 20n at the reference dimming ratio if no person is present in the illuminated space A0 in the second operation mode. On the other hand, if a person(s) is(are) present in the illuminated space A0 in the second operation mode, the controller 13 lights part of the lighting fixtures 201, 202, . . . , 20n, giving light around the person(s) and turns off remaining part thereof. The lighting control device 1 therefore lights a minimum number of lighting fixtures 2, required under the environment in which no external light enters the illuminated space A0, at a minimum dimming ratio required thereunder, and further improvement in energy-saving effect can be expected.

The aforementioned embodiment shows an example in which the lighting control device 1 judges whether or not the external light enters the illuminated space A0 based on the amplification factor of the image sensor 11, but is not limited thereto. For example, the lighting control device may be configured to judge whether or not the external light enters based on an average value of brightness values (pixel values) of the captured image.

The invention claimed is:

1. A lighting control device, configured to control each of lighting fixtures for giving respective light to an illuminated space, the lighting control device comprising:
 an acquisition unit configured to acquire, from an image sensor for capturing an image of the illuminated space, the captured image;
 a detector configured to detect first information which represents sensing presence or absence of a person in the illuminated space and represents a location of the person in the illuminated space when sensing the presence, and second information representing brightness of the illuminated space;
 a controller configured to control each of the lighting fixtures;
 a judgment unit configured to judge whether or not external light enters the illuminated space, the external light being light except for respective light from the lighting fixtures; and
 a switch configured to switch an operation mode of the controller so that it becomes a first mode when it is judged by the judgment unit that the external light enters and so that it becomes a second mode when it is judged that no external light enters, wherein
 the controller is configured:
 in the first mode, to receive both detected results of the first information and the second information from the detector and to control the lighting fixtures in unison so that the second information becomes a prescribed target value when the person is present in the illuminated space; and
 in the second mode, to receive a detected result of the first information from the detector and to individually control respective lighting fixtures in accordance with the first information regardless of the second information when the person is present in the illuminated space.

2. The lighting control device of claim 1, wherein the controller is configured, in the second mode, to light part of the lighting fixtures and to turn off remaining part thereof in accordance with the first information when the person is present in the illuminated space, the part of the lighting fixtures giving light around the person.

3. The lighting control device of claim 1, wherein
 the controller is configured, in the second mode, to light all of the lighting fixtures at a reference dimming ratio when no person is present in the illuminated space, and
 the reference dimming ratio is a value that is set so that minimum quantity of light that is necessary to detect the first information from the captured image is secured in the illuminated space.

4. The lighting control device of claim 1, wherein the controller is configured, when the person is present in the illuminated space in the first mode, to increase dimming ratios of the lighting fixtures if the second information is below the target value and to decrease the dimming ratios of the lighting fixtures if the second information is above the target value.

5. The lighting control device of claim 4, wherein
 the target value has a prescribed range, and
 the controller is configured, when the person is present in the illuminated space in the first mode, to control the lighting fixtures so that the second information is included in the range of the target value.

6. The lighting control device of claim 1, wherein the controller is configured, in the first mode, to turn off the lighting fixtures in unison when no person is present in the illuminated space.

7. The lighting control device of claim 1, wherein
 the image sensor comprises an amplifier configured to amplify an output, and an AGC circuit configured to automatically adjust an amplification factor of the amplifier, and
 the judgment unit is configured to judge whether or not the external light enters based on the amplification factor automatically adjusted by the AGC circuit.

8. A lighting system, comprising
 lighting fixtures; and
 a lighting control device configured to control each of the lighting fixtures for giving respective light to an illuminated space, the lighting control device comprising:

an acquisition unit configured to acquire, from an image sensor for capturing an image of the illuminated space, the captured image;

a detector configured to detect first information which represents sensing presence or absence of a person in the illuminated space and represents a location of the person in the illuminated space when sensing the presence, and second information representing brightness of the illuminated space;

a controller configured to control each of the lighting fixtures;

a judgment unit configured to judge whether or not external light enters the illuminated space, the external light being light except for respective light from the lighting fixtures; and a switch configured to switch an operation mode of the controller so that it becomes a first mode when it is judged by the judgment unit that the external light enters and so that it becomes a second mode when it is judged that no external light enters, wherein the controller is configured:

in the first mode, to receive both detected results of the first information and the second information from the detector and to control the lighting fixtures in unison so that the second information becomes a prescribed target value when the person is present in the illuminated space; and in the second mode, to receive a detected result of the first information from the detector and to individually control respective lighting fixtures in accordance with the first information regardless of the second information when the person is present in the illuminated space.

* * * * *